W. HOSKINS.
METHOD OF DESTROYING WEEDS.
APPLICATION FILED FEB. 12, 1910.
970,375.
Patented Sept. 13, 1910.
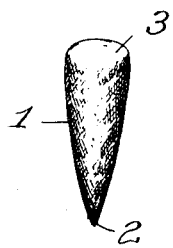
Witnesses:
Inventor:
William Hoskins,
By Dyrenforth, Lee, Chritton & Wiles,
Attys.

UNITED STATES PATENT OFFICE.

WILLIAM HOSKINS, OF CHICAGO, ILLINOIS.

METHOD OF DESTROYING WEEDS.

970,375.

Specification of Letters Patent. Patented Sept. 13, 1910.

Application filed February 12, 1910. Serial No. 543,443.

*To all whom it may concern:*

Be it known that I, WILLIAM HOSKINS, a citizen of the United States, residing at Chicago, in the county of Cook and State of Illinois, have invented a new and useful Method of Destroying Weeds, of which the following is a specification.

My invention relates to a method of destroying weeds and to that end it consists in inserting into the substance of the weed to be destroyed a chemical substance having weed-killing properties made up in the form of a solid body but which is soluble under the action of the natural juices of the weed into which it is inserted, and in a form that will adapt it to be applied to its purpose expeditiously, conveniently and cheaply, and in a manner to render it certainly effective without danger of exerting its destructive action on surrounding vegetation which it is wished not to destroy.

The weed for destroying which I have more particularly devised my improvement is the dandelion, though it is effective and intended for use in destroying weeds generally.

The chemical substance I prefer to use for my purpose is ferric sulfate, $Fe_2(SO_4)_3$, though any other substance having the desired property is within my invention, which lies in the embodiment of the destroying substance in a solid compound which dissolves under the action of moisture, and in a form which adapts it to be readily introduced into the substance of the weed to be destroyed by its action. To this end I mix with the ferric sulfate, in powdered condition, and water in suitable quantity, an agglutinant, preferably one that is soluble in water, and readily solidifies by drying, such as glucose, sugar, dextrin, glue, or the like, in the preferred proportions of ninety parts of the ferric sulfate to ten parts of the agglutinant, or thereabout. From the resultant plastic compound, pill-like bodies are formed, by molding, or otherwise, and they are then dried to harden them, in which condition they are ready for the trade and for use.

The particular form in which I prefer to embody the means for carrying out my method is that illustrated in the accompanying drawing by a perspective view in exaggerated dimensions.

The drawing shows a pill 1 made of the described compound and hardened by drying, of general frusto-conical shape, being of elongated form and tapering to a sharp point 2 from its wider end 3. The preferred dimensions of the form shown are a full half-inch in length and about one-sixth inch across the wider end.

To use the pill-like article, one is introduced, by hand, into the substance of each weed to be destroyed; and may be so introduced whatever the particular shape thereof may be. The operation is facilitated by the illustrated form of the article, since, by being pointed, it is adapted to penetrate the weed very readily by pressing it into the same. In using my improved article for destroying dandelions it is my practice to press a pill 1 into the substance of each weed, in which it dissolves under the influence of the moisture therein and is absorbed; and within a few hours after the insertion the action of the chemical has killed the weed, which is reduced thereby to a dry condition with the leaves withered.

What I claim as new and desire to secure by Letters Patent is—

1. The method of destroying weeds, which consists in forcibly inserting into the substance of the weed to be destroyed a pointed body adapted to enter the weed and sufficiently solid to withstand the pressure essential to such insertion, and containing a chemical substance having weed-killing properties soluble under the natural juices of the weed, whereby the weed is destroyed without previous treatment.

2. The method of destroying weeds, which consists in inserting into the substance of the weed to be destroyed a chemical substance consisting of a mixture comprising ferric sulfate and an agglutinant made up in the form of a solid body and soluble under the action of the natural juices in the weed.

WILLIAM HOSKINS.

In the presence of—
A. U. THORIEN,
R. A. RAYMOND.